Sept. 27, 1927.

J. P. CUSHNYR 1,643,544

CAR PLATFORM CRADLE FOR CAR WHEELS

Filed April 19, 1926

INVENTOR.
John P. Cushnyr
BY
ATTORNEYS.

Patented Sept. 27, 1927.

1,643,544

UNITED STATES PATENT OFFICE.

JOHN P. CUSHNYR, OF ASHTABULA, OHIO.

CAR-PLATFORM CRADLE FOR CAR WHEELS.

Application filed April 19, 1926. Serial No. 103,126.

This invention is designed to facilitate the loading of car wheels mounted on their axles on railroad cars. The present manner of loading them is to place them on a car and then anchor them with braces built on the car, each loading involving a re-building of the braces and this involves a very considerable expense and often leads to damage due to insufficient bracing. In the present invention metal cradles are provided for the wheels and these are secured to the car platform and the wheels simply placed in the cradles. This makes a very much more secure anchorage for the wheels and obviates the difficulty as to frequent renewals.

The invention is illustrated in the accompanying drawings as follows:—

Figure 1:
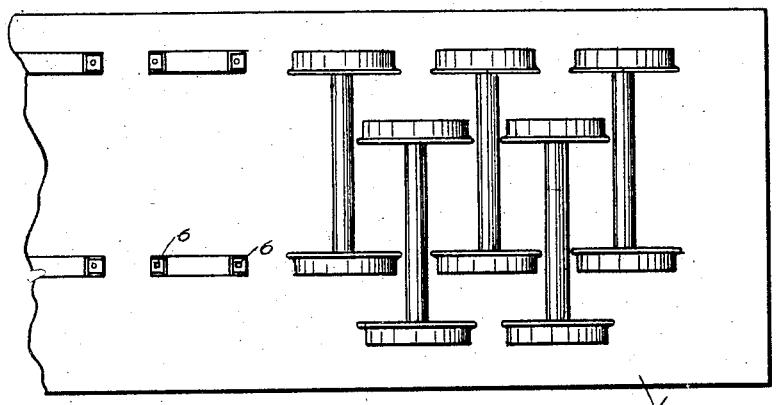

Fig. 1 shows a plan view of the car platform with the wheels loaded thereon.

Figure 2:
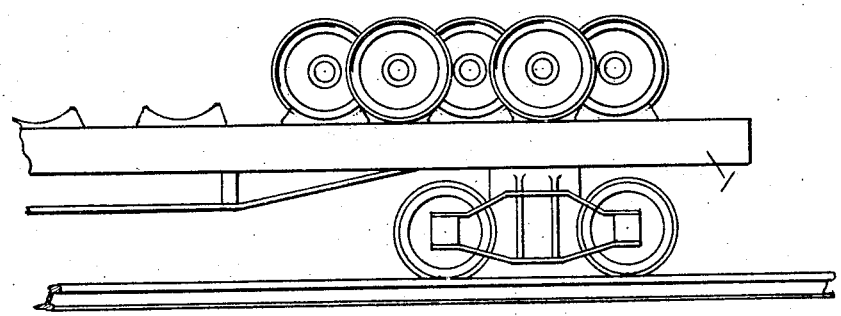

Fig. 2 a side elevation of the same.

Figure 3:
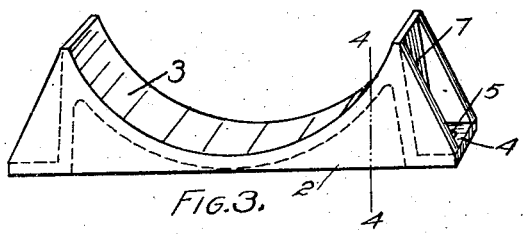

Fig. 3 a perspective view of one of the cradles.

Figure 4:
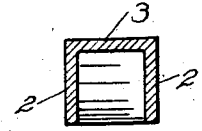

Fig. 4 a section on the line 4—4 in Fig. 3.

1 marks the car platform. The cradles are formed with side webs 2 which are curved along their upper edge to approximately conform to the arc of the car wheels. These are joined by a web 3 along their upper edge. A base plate 4 extends between the webs and near their ends and these are provided with perforations 5 by means of which the cradles are secured to the platforms by screws 6. An upright web 7 extends downwardly from the end of the curved web 3 between the sides 2 and to the bottom. It is spaced from the end of the base plate 4 so as to permit of the insertion of the screws 5.

The cradles are placed in series off-set on the platform as clearly shown in Fig. 1. The wheels which are carried by their axles are placed on this row of cradles. A second row of wheels may be placed on the platform between the first row of wheels and are anchored in place by the wheels which are resting in the cradles. The cradles should be of sufficient size to receive the largest sized wheels although the wheels do not vary very greatly in size. With the curve slightly larger than the curve of the wheels there is a slight rolling of the wheel which in a measure cushions the shock where the car is abruptly stopped. These cradles securely anchor wheels of this type and thus prevent any damage to the platform and are a permanent feature of the car so as to obviate the expense of the constant renewals.

What I claim as new is:—

1. In combination with a car platform of a wheel cradle comprising side webs with curved upper edges, a transverse web connecting the edges near their top, and base plates between the upright webs at their ends secured to the platform.

2. In combination with a car platform of a wheel cradle comprising side webs with curved upper edges, a transverse web connecting the wedges near their top, base plates between the upright webs at their ends secured to the platform; and upright webs extending from the ends of the transverse web to the base plates.

In testimony whereof I have hereunto set my hand.

JOHN P. CUSHNYR.